United States Patent
Warburton et al.

(10) Patent No.: US 7,478,092 B2
(45) Date of Patent: Jan. 13, 2009

(54) KEY TERM EXTRACTION

(75) Inventors: Kara C. Warburton, Aurora (CA);
Arendse Bernth, Ossining, NY (US);
Michael C. McCord, Ossining, NY
(US); David A. Walters, Rochester, MN
(US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 11/186,601

(22) Filed: Jul. 21, 2005

(65) Prior Publication Data

US 2007/0022115 A1      Jan. 25, 2007

(51) Int. Cl.
*G06F 7/00* (2006.01)
(52) U.S. Cl. .................. 707/7; 707/6; 715/234; 715/260
(58) Field of Classification Search .................. None
See application file for complete search history.

(56) References Cited

U.S. PATENT DOCUMENTS

| | | | | |
|---|---|---|---|---|
| 5,423,032 | A * | 6/1995 | Byrd et al. | 707/5 |
| 5,678,039 | A | 10/1997 | Hinks et al. | 707/4 |
| 5,850,561 | A * | 12/1998 | Church et al. | 715/234 |
| 6,014,697 | A | 1/2000 | Lewis et al. | 709/223 |
| 6,236,958 | B1 * | 5/2001 | Lange et al. | 704/8 |
| 6,629,097 | B1 * | 9/2003 | Keith | 707/5 |
| 6,829,599 | B2 * | 12/2004 | Chidlovskii | 707/3 |
| 6,925,650 | B1 * | 8/2005 | Arsenault et al. | 725/39 |
| 7,065,500 | B2 * | 6/2006 | Singh et al. | 705/26 |
| 7,181,438 | B1 * | 2/2007 | Szabo | 707/2 |
| 7,194,471 | B1 * | 3/2007 | Nagatsuka et al. | 707/100 |
| 7,200,592 | B2 * | 4/2007 | Goodwin et al. | 707/6 |
| 7,225,182 | B2 * | 5/2007 | Paine et al. | 707/3 |
| 7,254,530 | B2 * | 8/2007 | Klavans et al. | 704/10 |
| 2002/0007373 | A1 * | 1/2002 | Blair et al. | 707/505 |
| 2002/0120762 | A1 * | 8/2002 | Cheng et al. | 709/230 |
| 2003/0050927 | A1 * | 3/2003 | Hussam | 707/5 |
| 2003/0055816 | A1 * | 3/2003 | Paine et al. | 707/3 |

(Continued)

OTHER PUBLICATIONS

Bernth, A. et al., "Terminology Extraction for Global Management," Terminology, Sep. 2003, vol. 9, No. 1, pp. 51-69.

*Primary Examiner*—Pierre M. Vital
*Assistant Examiner*—Mohammad S Rostami
(74) *Attorney, Agent, or Firm*—Paul Barrett; Hoffman Warnick LLC (57) ABSTRACT

An improved solution for extracting and identifying key terms in content is provided. In the solution, one or more documents can be obtained and one or more candidate terms can be obtained from the content of each document. Subsequently, one or more exclusion conditions can be used to filter the candidate terms thereby generating a set of key terms. In particular, all common terms and/or all near duplicate candidate terms can be excluded from the set of key terms. The set of key terms can be used in translating the content, generating a glossary/index for the content, detecting and/or correcting incorrect terms and usages of terms in the content, building a terminology repository, and/or the like. In one embodiment, the key term extraction is performed to facilitate the translation of product documentation into a second language in order to release the product in one or more nations. In this case, candidate terms that have already been translated into the second language can also be excluded from the key terms.

18 Claims, 5 Drawing Sheets

U.S. PATENT DOCUMENTS

| | | | |
|---|---|---|---|
| 2003/0167209 A1* | 9/2003 | Hsieh | 705/26 |
| 2004/0068486 A1* | 4/2004 | Chidlovskii | 707/3 |
| 2004/0230416 A1* | 11/2004 | Ye et al. | 704/5 |
| 2004/0230599 A1* | 11/2004 | Moore et al. | 707/102 |
| 2005/0022115 A1 | 1/2005 | Baumgartner et al. | 715/513 |
| 2005/0108216 A1* | 5/2005 | Schramm-Apple et al. | 707/3 |
| 2006/0036568 A1* | 2/2006 | Moore et al. | 707/1 |
| 2006/0149767 A1* | 7/2006 | Kindsvogel et al. | 707/101 |
| 2006/0190446 A1* | 8/2006 | Lee et al. | 707/4 |

* cited by examiner

KEY TERM EXTRACTION

BACKGROUND OF THE INVENTION

1. Technical Field

The invention relates generally to the management of content, and more particularly, to an improved solution for managing key terms in the content.

2. Background Art

In information management, it is frequently desirable to extract key terms from content, such as a document. Term extraction benefits both the content authoring (e.g., generating a glossary, index, checking term consistency, identifying inappropriate terms, etc.) as well as content translation (e.g., advanced translation of key terms). To date, many key term extraction tools identify a substantial number of insignificant extra words, duplicate terms, and/or strings. Further, these tools frequently misidentify terms. The inclusion of these superfluous lexical units as output adds a substantial burden to the reviewer who will need to eliminate them, thereby reducing the usability of the output and adding to the cost and time required to complete the key term extraction.

In response, an improved key term extraction tool was created by International Business Machines Corp. of Armonk, N.Y. (IBM). As described in the paper entitled "Terminology Extraction for Global Content Management", Terminology, September 2003, vol. 9, no. 1, pp. 51-69, which is hereby incorporated herein by reference, the tool scans a file and effectively extracts nouns/noun phrases along with other information, which is then included in a list. However, while the output is more effective than previous tools, a substantial number of extra lexical units continue to be output by the tool.

As a result, a need exists for an improved key term extraction tool and process that further reduces the inclusion of lexical units in the output that are not needed for the intended content authoring and/or translation purposes.

SUMMARY OF THE INVENTION

The invention provides an improved solution for extracting and identifying key terms in content. In the solution, one or more documents can be obtained and one or more candidate terms can be obtained from the content of each document. Subsequently, one or more exclusion conditions can be used to filter the candidate terms thereby generating a set (one or more) of key terms. In particular, all common terms and/or all near duplicate candidate terms can be excluded from the set of key terms. The set of key terms can be used in translating the document, generating a glossary/index for the document, detecting and/or correcting incorrect terms and usages of terms in the document, building a terminology repository, and/or the like. In one embodiment, the key term extraction is performed to facilitate the translation of product documentation into a second language in order to release the product in one or more nations. In this case, candidate terms that have already been translated into the second language can also be excluded from the key terms.

A first aspect of the invention provides a method of managing content, the method comprising: obtaining a set of candidate terms from the content; and filtering the set of candidate terms based on a set of general exclusion conditions, wherein the set of general exclusion conditions includes at least one of: an exclusion condition for excluding all candidate terms that appear in a set of common terms or an exclusion condition for excluding all near duplicate candidate terms.

A second aspect of the invention provides a system for managing content, the system comprising: a system for obtaining a set of candidate terms from the content; and a system for filtering the set of candidate terms based on a set of general exclusion conditions, wherein the set of general exclusion conditions includes at least one of: an exclusion condition for excluding all candidate terms that appear in a set of common terms or an exclusion condition for excluding all near duplicate candidate terms.

A third aspect of the invention provides a program product stored on a computer-readable medium, which when executed, manages content, the computer-readable medium comprising program code for performing the following steps: obtaining a set of candidate terms from the content; and filtering the set of candidate terms based on a set of general exclusion conditions, wherein the set of general exclusion conditions includes at least one of: an exclusion condition for excluding all candidate terms that appear in a set of common terms or an exclusion condition for excluding all near duplicate candidate terms.

A fourth aspect of the invention provides a method of managing the translation of content, the method comprising: obtaining a set of candidate terms from the content for translation from a source language to a target language; obtaining a set of general exclusion conditions, wherein the set of general exclusion conditions includes at least one of: an exclusion condition for excluding all candidate terms that appear in a set of common terms or an exclusion condition for excluding all near duplicate candidate terms; filtering the set of candidate terms based on the set of general exclusion conditions; translating the filtered set of candidate terms; and providing the translated set of candidate terms and the content for use by a translator.

A fifth aspect of the invention provides a system for managing the translation of content, the system comprising: a system for obtaining a set of candidate terms from the content for translation from a source language to a target language; a system for filtering the set of candidate terms based on a set of general exclusion conditions, wherein the set of general exclusion conditions includes at least one of: an exclusion condition for excluding all candidate terms that appear in a set of common terms or an exclusion condition for excluding all near duplicate candidate terms; a system for translating the filtered set of candidate terms; and a system for providing the translated set of candidate terms and the content for use by a translator.

A sixth aspect of the invention provides a program product stored on a computer-readable medium, which when executed, manages the translation of content, the computer-readable medium comprising program code for performing the following steps: obtaining a set of candidate terms from the content for translation from a source language to a target language; filtering the set of candidate terms based on a set of general exclusion conditions, wherein the set of general exclusion conditions includes at least one of: an exclusion condition for excluding all candidate terms that appear in a set of common terms or an exclusion condition for excluding all near duplicate candidate terms; program code for translating the filtered set of candidate terms; and providing the translated set of candidate terms and the content for use by a translator.

A seventh aspect of the invention provides a business method for managing content, the business method comprising managing a computer infrastructure that performs each of the steps of the invention in order to extract key terms, translate the content and/or generate a glossary/index for the content; and receiving payment based on the managing step.

An eighth aspect of the invention provides a method of generating a system for managing content, the method comprising: obtaining a computer infrastructure; and deploying means for performing each of the steps of the invention in order to extract key terms, translate the content and/or generate a glossary/index for the content to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides an improved solution for extracting and identifying key terms in content. In the solution, one or more documents can be obtained and one or more candidate terms can be obtained from the content of each document. Subsequently, one or more exclusion conditions can be used to filter the candidate terms thereby generating a set (one or more) of key terms. In particular, all common terms and/or all near duplicate candidate terms can be excluded from the set of key terms. The set of key terms can be used in translating the document, generating a glossary/index for the document, detecting and/or correcting incorrect terms and usages of terms in the document, building a terminology repository, and/or the like. In one embodiment, the key term extraction is performed to facilitate the translation of product documentation into a second language in order to release the product in one or more nations. In this case, candidate terms that have already been translated into the second language can also be excluded from the key terms.

Figure 1:
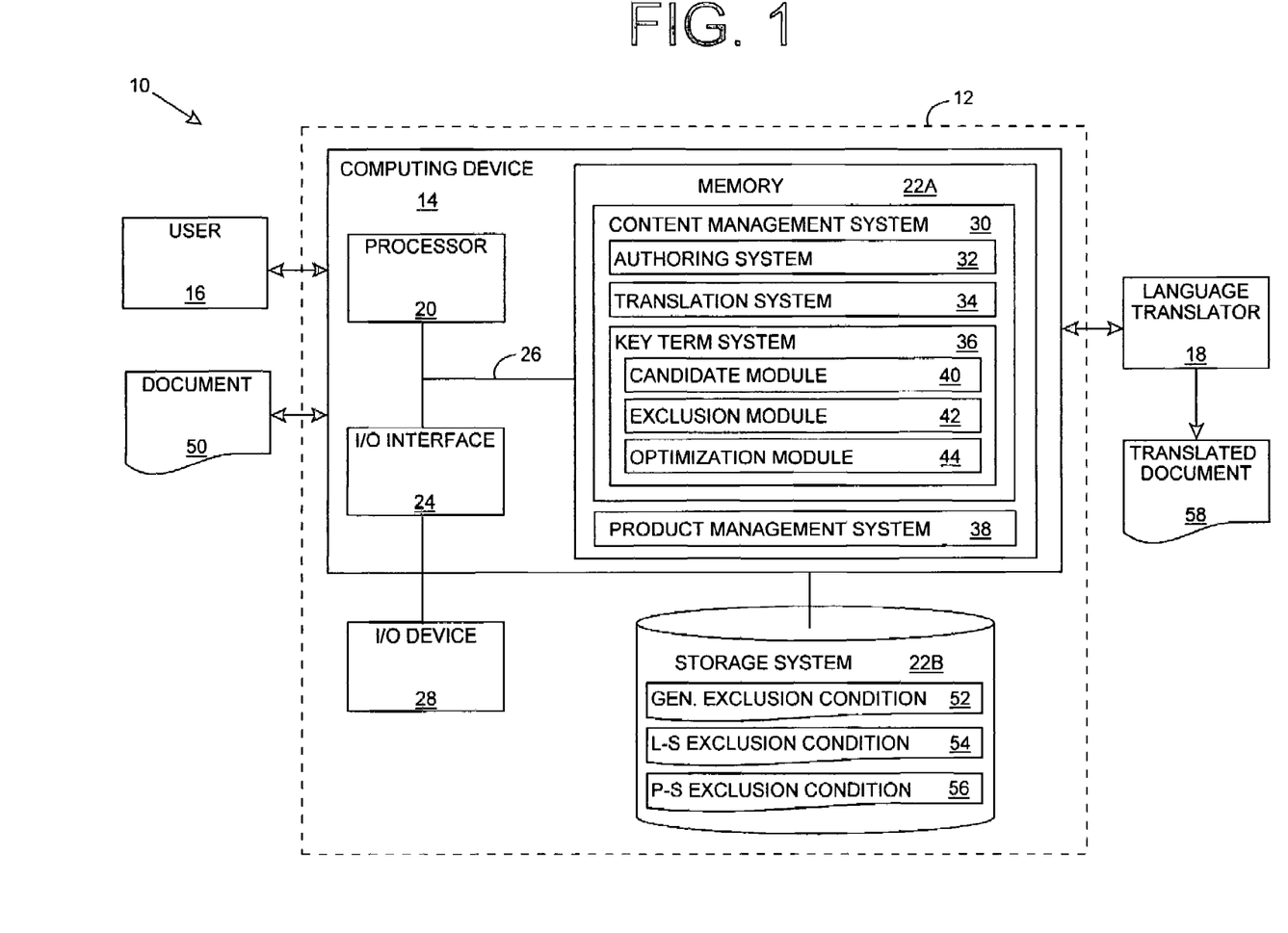
FIG. 1 shows an illustrative environment for managing content.

Turning to the drawings, FIG. 1 shows an illustrative environment 10 for managing content, such as one or more documents 50. To this extent, environment 10 includes a computer infrastructure 12 that can perform the various process steps described herein for managing document(s) 50, especially with respect to extracting one or more key terms from the content of document 50 and/or generating a translated document 58 based on document 50. In particular, computer infrastructure 12 is shown including a computing device 14 that comprises a content management system 30, which enables computing device 14 to manage the content of document 50 by performing the process steps of the invention.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as content management system 30, that is stored in memory 22A and/or storage system 22B. While executing computer program code, processor 20 can read and/or write data, such as document 50, to/from memory 22A, storage system 22B, and/or I/O interface 24. Bus 26 provides a communications link between each of the components in computing device 14. I/O device 28 can comprise any device that enables user 16 to interact with computing device 14 or any device that enables computing device 14 to communicate with one or more other computing devices.

In any event, computing device 14 can comprise any general purpose computing article of manufacture capable of executing computer program code installed by a user 16 (e.g., a personal computer, server, handheld device, etc.). However, it is understood that computing device 14 and content management system 30 are only representative of various possible equivalent computing devices that may perform the various process steps of the invention. To this extent, in other embodiments, computing device 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of wired and/or wireless communications link, such as a network, a shared memory, or the like, to perform the various process steps of the invention. To this extent, user 16 can use a computing device (not shown) to access content management system 30 over one or more communications links. When a communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As previously mentioned and discussed further below, content management system 30 enables computing infrastructure 12 to manage content, such as one or more documents 50. To this extent, content management system 30 is shown including an authoring system 32, a translation system 34, and a key term system 36. In one embodiment, content management system 30 is used in conjunction with a product management system 38, which manages product development, and in particular the release of a new product, a new version of a product, and the like. Operation of each of these systems is discussed further herein. However, it is understood that some of the various systems shown in FIG. 1 can be implemented independently, combined, and/or stored in memory for one or more separate computing devices that are included in computer infrastructure 12. For example, key term system 36 could be implemented apart from content management system 30. In this case, key term system 36 can include an application program interface that enables content management system 30 to use the functionality provided by key term system 36. In one embodiment, key term system 36 is implemented as a series of perl routines that can be launched for use by an application. Further, it is understood that some of the systems and/or functionality may not be implemented, or additional systems and/or functionality may be included as part of environment 10.

Regardless, the invention provides an improved solution for managing content, such as one or more documents 50. Document 50 can comprise any type of database that includes parsable textual data. To this extent, document 50 can comprise one or more information files, a text stream communicated over a network, or the like. In any event, one or more users 16 can use authoring system 32 to author (e.g., create, modify, etc.) document 50. Alternatively, authoring system 32 can obtain document 50 from another system used to generate document 50.

Regardless, it is frequently desirable to extract a set of key terms from document 50. In general, a key term comprises one or more words. For example, a key term can comprise a noun or a noun group. A noun group comprises the portion of a noun phrase that follows a possible determiner (e.g., the, a, this, each, etc.) and includes all words through the head noun. Typically, a noun group can comprise a single noun, two or more consecutive nouns, an adjective followed by one or more nouns, a past/present participle followed by one or more nouns, and the like. In any event, the key terms can be used to generate a glossary or an index for document 50, can be used to classify the content included in document 50, and the like. Additionally, the key terms can comprise a set (one or more) of terms that may require advanced attention prior to translating the content of document 50 into another language. For example, when document 50 comprises technical content, such as a user manual for a product, document 50 may include several terms that have a special meaning with respect to the product. For some of these key terms, there may be multiple possibilities for translating the key terms into a target language. In this case, it is desirable that these key terms be separately translated ahead of time, and the translated key terms then can be provided to a language translator 18 for use when translating document 50 into a translated document 58.

Figure 2:
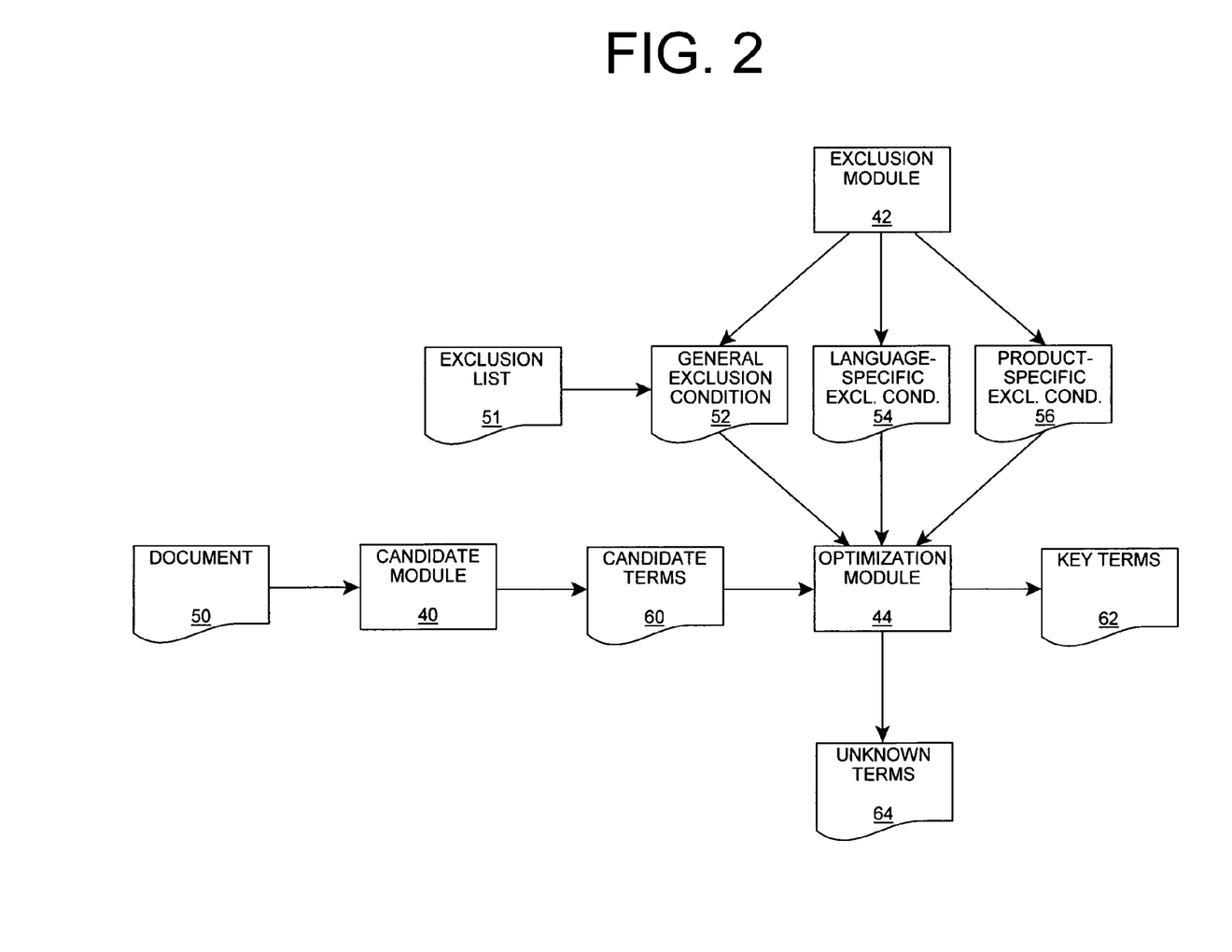
FIG. 2 shows an illustrative data flow diagram for the various modules included in the key term system of FIG. 1.

When, for example, document 50 is otherwise complete or close to completion, user 16 can request authoring system 32 to extract a set of key terms for document 50. In response, authoring system 32 can provide document 50 for access by key term system 36, which can generate a set of key terms for document 50. To this extent, FIG. 2 shows an illustrative data flow diagram for the various modules included in key term system 36. Initially, a candidate module 40 can receive document 50. Candidate module 40 can generate a set (one or more) of candidate terms 60 from document 50. For example, candidate module 40 can comprise a terminology extraction tool such as TermExt, developed by IBM. In this case, candidate module 40 can perform a full parsing of the text in document 50 with a broad-coverage parser to extract and generate the set of candidate terms 60. However, it is understood that this is only illustrative, and any solution for generating the set of candidate terms 60 based on the content of document 50 can be used.

Further, in addition to the term itself, each candidate term 60 can include various information on the term. For example, candidate term 60 can include information on a number of occurrences of the term in document 50, the location for each occurrence, a context of one or more of the occurrences (e.g., a sentence), and the like. This information can be used in subsequent processing of candidate terms 60.

In any event, candidate terms 60 can be provided to/obtained by optimization module 44. Optimization module 44 can filter the set of candidate terms 60 based on one or more exclusion conditions to generate a set of key terms 62. To this extent, optimization module 44 can obtain various types of exclusion conditions from exclusion module 42. In particular, exclusion module 42 can manage one or more types of exclusion conditions, and enable user 16 (FIG. 1) to select one or more exclusion conditions to be used by optimization module 44. For example, exclusion module 42 can generate a user interface for presentation to user 16, which enables user 16 to select/deselect from a list of available exclusion conditions. Further, user 16 could generate (e.g., define) and/or modify one or more exclusion conditions using exclusion module 42 in a known manner. Alternatively, another system, such as authoring system 32 (FIG. 1), can communicate the set (one or more) of exclusion conditions to be applied by optimization module 44.

As noted previously, exclusion module 42 can manage various types of exclusion conditions. For example, exclusion module 42 can provide one or more general exclusion conditions 52 to optimization module 44. General exclusion condition 52 can comprise any type of exclusion condition that is applied to candidate terms 60 obtained from various types of documents 50. For example, general exclusion condition 52 can comprise an exclusion list 51 that includes various terms that are not to be included as key terms. In particular, when key terms 62 are to be translated, exclusion list 51 could comprise a list of terms that are not to be translated. Similarly, when key terms 62 are to be used to generate a glossary, exclusion list 51 could comprise a set (one or more) of terms that are already included in the glossary.

Further, one or more general exclusion conditions 52 could be specific to a particular format of the content in document 50. For example, document 50 could comprise content in a markup language such as hyper text markup language (HTML) or a standard generalized markup language (SGML). In this case, a general exclusion condition 52 could specify that all text within one of a set (one or more) of specified markup tags should be excluded from key terms 62. For example, a markup tag may indicate the start of machine readable information. In this case, the translation of such information into a foreign language could render the file unusable. As a result, the text included within the markup tag can be excluded from key terms 62.

When document 50 includes technical content, or the like, it often will include examples of machine readable information. Frequently, machine readable terms comprise one or more distinctive formatting options. For example, the term may comprise a single word that is not found in a general purpose dictionary, may appear in all caps or mixed caps, in which a letter other than the first letter is capitalized, include numbers, or the like. However, one or more of these terms could be new terminology, an acronym, a typographical error, or the like. As a result, rather than remove these from candidate terms 60, optimization module 44 can identify a set (one or more) of unknown terms 64. To this extent, one or more exclusion conditions, such as general exclusion condition 52, can identify one or more conditions for a candidate term 60 to be identified as an unknown term 64 and/or excluded from key terms 62. The set of unknown terms 64 can be maintained separately from the set of key terms 62 and/or comprise a portion of key terms 62 marked as being unknown.

One problem with candidate terms 60, particularly for large documents 50, is the number of candidate terms 60 that are identified but are not relevant to the desired purpose (e.g., glossary generation, translation, etc.). While the general exclusion condition(s) 52 discussed above can reduce the size of the original set of candidate terms 60, the overall size can remain prohibitive. As a result, one or more additional general exclusion conditions 52 can be used by optimization module 44 in filtering key terms 62 and/or unknown terms 62. For example, a general exclusion condition 52 can specify that all candidate terms 60 that appear in a set of common terms (e.g., "person", "day", etc.) be excluded from key terms 62. In one embodiment, the set of common terms are selected from the general lexicon and provided as an exclusion list 51. Further, one or more candidate terms 60 can be identified and added to the set of common terms during optimization. In any event, key terms 62 can be generated for subsequent pre-translation. In this case, the removal of common terms is desirable, since they offer no translation challenge and do not need to be pre-translated. Similarly, key terms 62 can be used to generate a glossary or classify document 50, in which case common terms are unlikely to be needed.

Optimization module 44 can also modify one or more candidate terms 60 for analysis. In particular, optimization module 44 can remove one or more pre-modifiers in a candidate term 60 that are included in a set of common pre-modifiers. For example, "new" can be included in the set of common pre-modifiers and a candidate term 60 might comprise "new voice interface". In this case, optimization module 44 can modify candidate term 60 to "voice interface" since the common pre-modifier would not be part of a key term 62. After modifying a particular candidate term 60, optimization module 44 can determine if the modified candidate term 60 comprises a duplicate of another candidate term 60. If so, optimization module 44 can merge the information (e.g., number of occurrences, context, etc.) for both candidate terms 60 into a single candidate term 60.

Additionally, another general exclusion condition 52 could comprise the exclusion of all "near duplicate" candidate terms 60. As noted above, when a candidate term 60 appears multiple times in document 50, candidate module 40 only includes a single occurrence of the term in candidate terms 60. However, a term may appear in document 50 with one or more minor differences, such as different capitalization, hyphenation, an addition of a space (e.g., "database" vs. "data base") and/or the like. In this case, candidate module 40 will typically treat these as separate candidate terms 60. To this extent, optimization module 44 can exclude the near duplicate candidate terms based on a general exclusion condition 52. For example, the general exclusion condition 52 could specify one or more differences between candidate terms 60 that are considered minor and therefore will classify one of the candidate terms 60 as a near duplicate candidate term 60, which should be excluded from key terms 62. Further, the near duplicate candidate terms 60 could be identified as unknown terms 64 to enable a user 16 (FIG. 1) to make the usage consistent. In one embodiment, one of a pair of near duplicate candidate terms 60 is selected for inclusion as an unknown term 64 based on the corresponding number of occurrences in document 50 (e.g., the term having fewer occurrences is classified as the unknown term 64).

When the set of candidate terms 60 are to be translated from a source language to a target language, optimization module 44 can also apply one or more language-specific exclusion conditions 54. For example, a language-specific exclusion condition 54 could exclude each candidate term 60 that has previously been translated to the target language. In this case, optimization module 44 can compare each candidate term 60 to a translation dictionary for the target language. When candidate term 60 appears in the translation dictionary, optimization module 44 can exclude it from the set of key terms 62. In one embodiment, the translation dictionary can comprise a bilingual dictionary that includes the candidate term 60 in the source language and a corresponding translation of the candidate term 60 in the target language. Further, the bilingual dictionary can include additional information, such as a definition of the term, a context of the term, etc. To this extent, optimization module 44 could determine whether candidate term 60 should be excluded based on the context in which it is used. In particular, if candidate term 60 is used in a sufficiently different context from the context in the bilingual dictionary, optimization module 44 could include candidate term 60 in the set of key terms 62.

Further, when document 50 is associated with a product, optimization module 44 can obtain a set of product-specific exclusion conditions 56. For example, a product-specific exclusion condition could comprise a set of terms included in the glossary/index of documentation for a previous version of the product. In this case, these terms can be automatically included in the glossary/index for document 50 and therefore can be excluded from key terms 62.

It is understood that the various types of exclusion conditions 52, 54, 56 are not intended to be comprehensive or mutually exclusive. To this extent, the applicability of an exclusion condition could be dependent on the product, source language, and/or target language. For example, each product can have a corresponding bilingual dictionary of previously translated terms. In this case, optimization module 44 can reference a unique bilingual dictionary based on the product, source language, and target language for a desired translation of document 50. Exclusion conditions 52, 54, 56 are shown and discussed as being separate types for explanatory purposes only.

Figure 3:
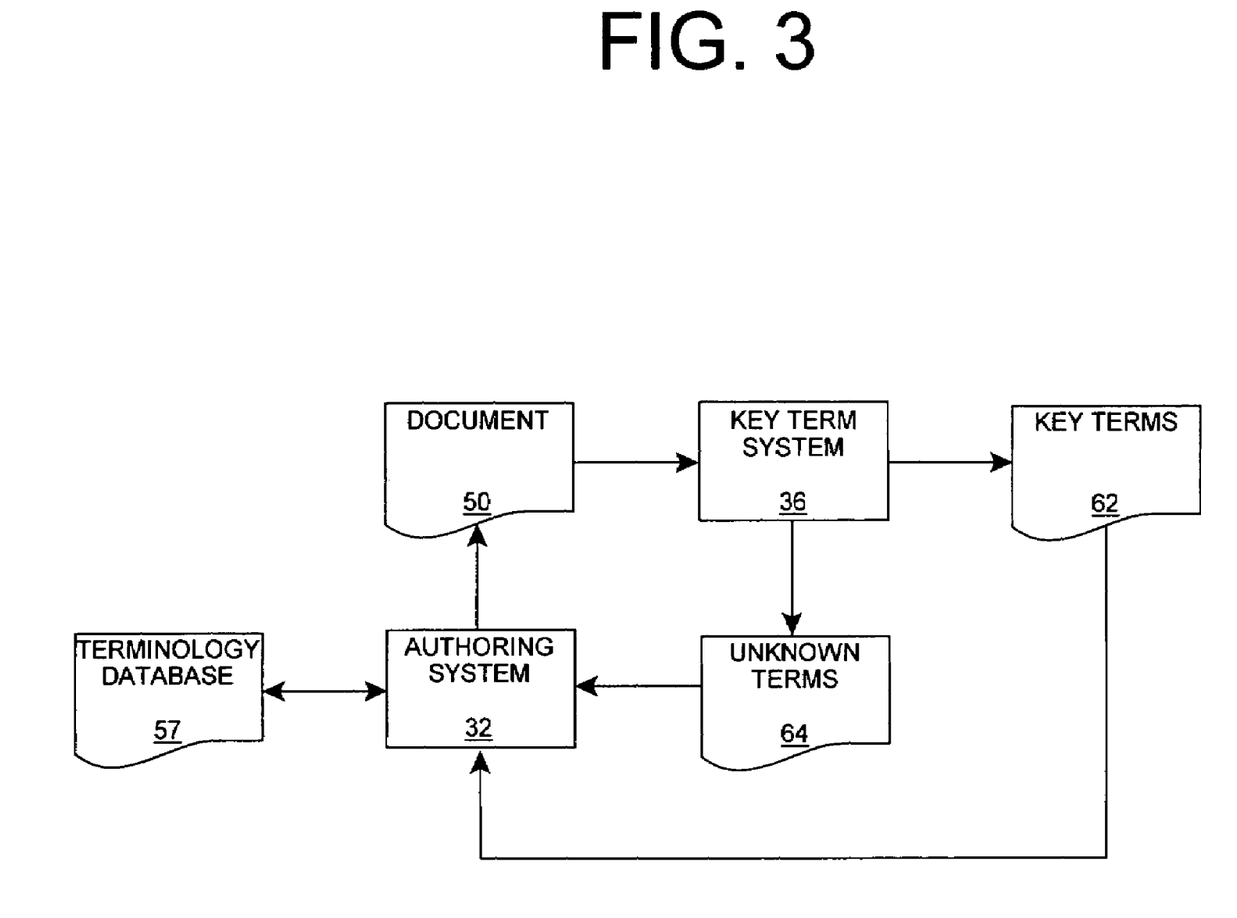
FIG. 3 shows an illustrative data flow diagram that uses key terms and unknown terms in authoring a document.

As noted previously, the set of key terms 62 and/or unknown terms 64 can be used in one or more additional information management functions. For example, FIG. 3 shows an illustrative data flow diagram that uses the set of key terms 62 and the set of unknown terms 64 in authoring document 50. In particular, as discussed above, key term system 36 can generate a set of key terms 62 based on the content of document 50. Subsequently, the set of key terms 62 can be provided to authoring system 32. A user 16 (FIG. 1) can use authoring system 32 to generate a glossary and/or an index for document 50 based on the set of key terms 62. For example, authoring system 32 can generate a display that includes the set of key terms 62, and user 16 can select one or more of the key terms 62 for inclusion in the glossary and/or index for document 50.

Similarly, authoring system 32 can obtain and generate a display that includes the set of unknown terms 64. Subsequently, user 16 (FIG. 1) can use the display to designate one or more of the set of unknown terms 64 for inclusion in a glossary and/or index for document 50. Alternatively, user 16 could provide a correction to one or more of the unknown terms 64. For example, an unknown term 64 could comprise a misspelled term or the like. In this case, user 16 can correct the spelling. After receiving the correction, authoring system 32 can locate each occurrence of the misspelled term in document 50 and automatically incorporate the correction into document 50. It is understood that one or more corrections could also be made to key terms 62 in the same manner. This process can be repeated any number of times when authoring document 50.

Further, in addition to a glossary and/or index for document 50, authoring system 32 can create, modify, etc., a terminology database 57 based on the set of key terms 62 and/or the set of unknown terms 64. To this extent, terminology database 57 can comprise a single database of terms for a company. In particular, terminology database 57 can include terms and their corresponding definitions for multiple products/services offered by the company. In this case, terminology database 57 will provide a single place that users 16 (FIG. 1) can look for definitions of terms, rather than searching product/service-specific documentation. In any event, optimization module 44 (FIG. 1) can mark each key term 62 as either being included in or not included in terminology database 57 and/or exclude key terms 62 that are already included in terminology database 57 (e.g., as part of exclusion list 51 discussed above with reference to FIG. 2). In either case, a user 16 can use authoring system 32 to add one or more key terms 62 to terminology database 57.

Figure 4:
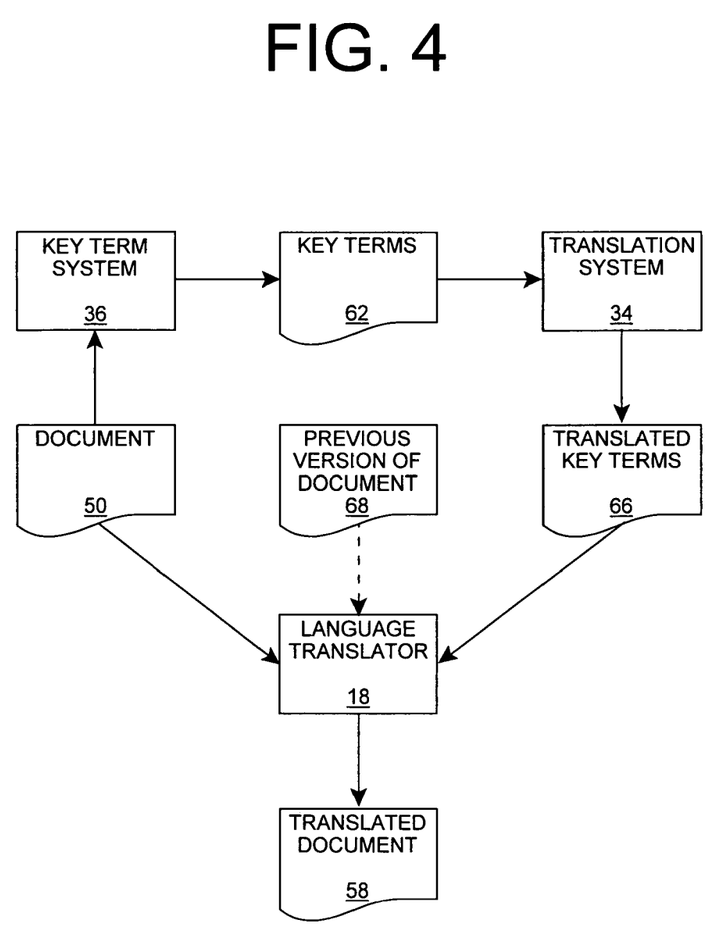
FIG. 4 shows an illustrative data flow diagram for creating a translated document based on a document.

Additionally, the set of key terms 62 and/or the set of unknown terms 64 can be used in the translation of the content of document 50. For example, document 50 could comprise hundreds of information files that represent thousands of pages of content. In this case, it may be desirable to provide unique subsets of the information files to different translators for translation. However, when document 50 includes specialized terminology, such as technical terms, it may be desirable to first translate these terms so that the translated term is consistent for all translators. To this extent, FIG. 4 shows an illustrative data flow diagram for creating a translated document 58 based on document 50. As discussed above, document 50 can be provided to key term system 36, which generates a set of key terms 62. The set of key terms 62 can be provided to translation system 34. A translator (e.g., user 16 of FIG. 1) can use translation system 34 to translate the set of key terms 62 into a target language. While not shown, the set of unknown terms 64 (FIG. 3) also can be provided to translation system 34 and processed in the same manner. Alternatively, the set of unknown terms 64 can be first processed using authoring system 32 (FIG. 3) as discussed above.

In any event, the translated key terms 66 can be provided along with document 50 to one or more language translators 18. The language translator(s) 18 can use the translated key terms 66 to create a translated document 58 based on document 50. In one embodiment, language translator 18 is remote from content management system 30 as shown in FIG. 1. In this case, translated key terms 66 and document 50 can be communicated over a communications link, such as a network, and language translator 18 can comprise a software package or the like for use by a translator when translating document 50. To this extent, the translated key terms 66 can be automatically displayed by language translator 18 when the corresponding key term 62 appears in document 50, thereby providing further assurance that the correct translation for each key term 62 is used in translated document 58.

As noted above, document 50 can comprise a modified version of a previous document. To this extent, if available, translation system 34 can further provide a translated version of the previous document 68 to language translator 18 for use by the translator in translating document 50. For example, when a portion of the content document 50 is the same as the content of previous document 68, language translator 18 can automatically use the previously translated text, thereby saving the translator time. In any event, once translated document 58 has been generated, language translator 18 can provide it to translation system 34.

Figure 5:
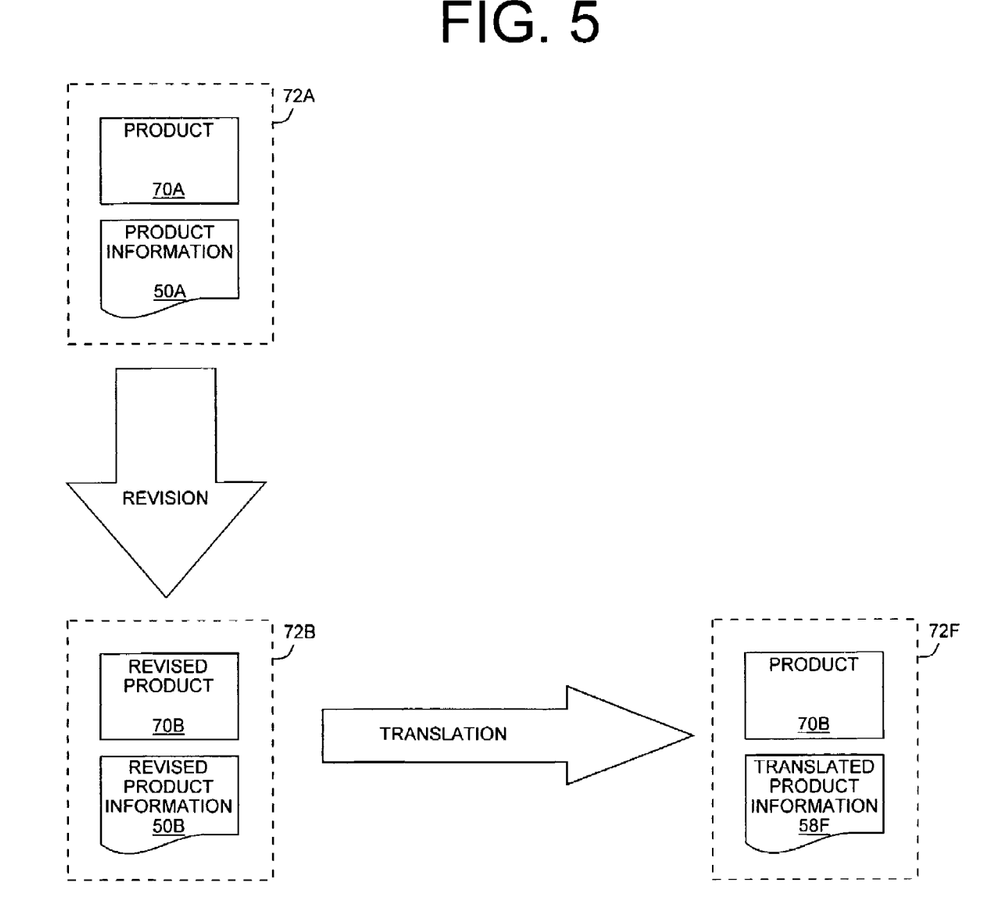
FIG. 5 shows an illustrative product release that can be managed by the product management system of FIG. 1.

In one embodiment, the extraction of key terms is performed as part of a release process for a product, such as a software product. For example, FIG. 5 shows an illustrative product release that can be managed by product management system 38 (FIG. 1). In general, a product version 72A includes both a product 70A (e.g., a program product that is sold/licensed for use by others) and its corresponding product information 50A (i.e., documentation). Product management system 38 can manage the addition/alteration of one or more features to an existing product 70A that are implemented in response to, for example, consumer demand. To this extent, periodically, a new product version 72B is developed and released. In generating the new product version 72B, product management system 38 can manage the development of a revised product 70B. Further, product management system 38 can manage the development of a revised product information 50B that includes modifications and/or additions based on revised product 70B. To this extent, product management system 38 can use content management system 30 (FIG. 1) to manage the development of the revised product information 50B. In this case, key terms 62 can be used in correcting language usage in revised product information 50B and/or updating a glossary and/or index for revised product information 50B.

Increasingly, it is desirable to make product version 72B available in multiple languages for release in various nations. To this extent, it is desirable to translate product version 72B to a foreign product version 72F that includes translated product information 58F in the primary language for a particular nation. As a result, product management system 38 (FIG. 1) can use content management system 30 (FIG. 1) to manage the generation of translated product information 58F based on product information 50B. In this case, key terms 62 for product information 50B can be pre-translated, thereby accelerating the generation of translated product information 58F while increasing the consistency of the resulting translation. In this manner, the foreign product version 72F can be released at an earlier date with improved readability of its product information 58F.

While shown and described herein as a method and system for managing content, particularly with respect to extracting key terms from the content, it is understood that the invention further provides various alternative embodiments. For example, in one embodiment, the invention provides a computer-readable medium that includes computer program code to enable a computer infrastructure to manage content. To this extent, the computer-readable medium includes program code, such as content management system 30 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Application Service Provider, could offer to manage content as described herein. In this case, the service provider can manage (e.g., create, maintain, support, etc.) a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for managing content. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing a document, the method comprising:
   extracting a set of candidate terms from the document using a terminology extraction tool, each candidate term being one of: a noun or a noun group;
   filtering the set of candidate terms based on a set of general exclusion conditions, wherein the set of general exclusion conditions includes: an exclusion condition for excluding all candidate terms that appear in a set of common terms, each common term being one of: a noun or a noun group that is selected from the general lexicon and does not require inclusion in any of: a glossary for the document, a terminology repository for the document, an index of terms for the document, or a set of terms requiring pre-translation, and an exclusion condition for excluding all near duplicate candidate terms, each near duplicate candidate term differing from another candidate term in the set of candidate terms by at least one of: a space, capitalization, or hyphenation; and
   generating at least one of: a glossary for the document, a terminology repository for the document, an index of terms for the document, or a translated set of candidate terms based on the filtered set of candidate terms,
   identifying a set of unknown terms in the document, the identifying including each near duplicate candidate term in the set of unknown terms;
   receiving a correction to one of the set of unknown terms; and incorporating the correction into the document.

2. The method of claim 1, the generating including:
   translating the filtered set of candidate terms from a first language to a second language; and
   providing the translated set of candidate terms and the document for use by a translator.

3. The method of claim 2, wherein the filtering is further based on at least one of: a set of language-specific exclusion conditions or a set of product-specific exclusion conditions.

4. A program product stored on a physical computer-readable medium, which when executed, enables a computer infrastructure to manage the document, the program product comprising program code for performing the method steps of claim 1.

5. A method of generating a system for managing the document, the method comprising:
   obtaining a computer infrastructure; and
   for each of the steps of claim 1, deploying a means for performing the step to the computer infrastructure.

6. A system for managing a document, the system comprising:
   at least one computer including;
   a system for extracting a set of candidate terms from the content, each candidate term being one of: a noun or a noun group;
   a system for filtering the set of candidate terms based on a set of general exclusion conditions, wherein the set of general exclusion conditions includes: an exclusion condition for excluding all candidate terms that appear in a set of common terms, each common term being one of: a noun or a noun group that is selected from the general lexicon and does not require inclusion in any of: a glossary for the document, a terminology repository for the document, an index of terms for the document, or a set of terms requiring pre-translation, and an exclusion condition for excluding all near duplicate candidate terms, each near duplicate candidate term differing from another candidate term in the set of candidate terms by at least one of: a space, capitalization, or hyphenation; and
   a system for generating at least one of: a glossary for the document, a terminology repository for the document, an index of terms for the document, or a translated set of candidate terms based on the filtered set of candidate terms,
   identifying a set of unknown terms in the document, the identifying including each near duplicate candidate term in the set of unknown terms;
   receiving a correction to one of the set of unknown terms; and incorporating the correction into the document.

7. The system of claim 6, the system for generating including:
   a system for translating the filtered set of candidate terms; and
   a system for providing the translated set of candidate terms and the document for use by a translator.

8. The system of claim 7, wherein the filtering is further based on at least one of: a set of language-specific exclusion conditions or a set of product-specific exclusion conditions.

9. A method of managing the translation of content, the method comprising:
   obtaining a set of candidate terms from the content for translation from a source language to a target language, each candidate term being one of: a noun or a noun group;
   obtaining a set of general exclusion conditions, wherein the set of general exclusion conditions includes: an exclusion condition for excluding all candidate terms that appear in a set of common terms, each common term being one of: a noun or a noun group that is selected from the general lexicon and does not require pre-translation, and an exclusion condition for excluding all near duplicate candidate terms, each near duplicate candidate term differing from another candidate term in the set of candidate terms by at least one of: a space, capitalization, or hyphenation;

filtering the set of candidate terms based on the set of general exclusion conditions;

translating the filtered set of candidate terms from the source language to the target language; and providing the translated set of candidate terms and the content for use by a translator;

identifying a set of unknown terms in the content, the identifying including each near duplicate candidate term in the set of unknown terms;

receiving a correction to one of the set of unknown terms; and incorporating the correction into the content.

10. The method of claim 9, further comprising identifying a set of unknown terms in the content.

11. The method of claim 9, further comprising obtaining a set of language-specific exclusion conditions based on the target language, wherein the filtering step is further based on the set of language-specific exclusion conditions, and wherein the set of language-specific exclusion conditions includes an exclusion condition for excluding each candidate term that has previously been translated to the target language.

12. The method of claim 9, further comprising obtaining a set of product-specific exclusion conditions, wherein the content is associated with a product and wherein the filtering step is further based on the set of product-specific exclusion conditions.

13. A system for managing the translation of content, the system comprising:

at least one computer including;

a system for obtaining a set of candidate terms from the content for translation from a source language to a target language, each candidate term being one of: a noun or a noun group;

a system for filtering the set of candidate terms based on a set of general exclusion conditions, wherein the set of general exclusion conditions includes: an exclusion condition for excluding all candidate terms that appear in a set of common terms, each common term being one of: a noun or a noun group that is selected from the general lexicon and does not require pre-translation, and an exclusion condition for excluding all near duplicate candidate terms, each near duplicate candidate term differing from another candidate term in the set of candidate terms by at least one of: a space, capitalization, or hyphenation;

a system for translating the filtered set of candidate terms from the source language to the target language; and a system for providing the translated set of candidate terms and the content for use by a translator;

identifying a set of unknown terms in the content, the identifying including each near duplicate candidate term in the set of unknown terms;

receiving a correction to one of the set of unknown terms; and incorporating the correction into the content.

14. The system of claim 13, further comprising a system for identifying a set of unknown terms in the content.

15. The system of claim 13, wherein the filtering is further based on a set of language-specific exclusion conditions, and wherein the set of language-specific exclusion conditions includes an exclusion condition for excluding each candidate term that has previously been translated to the target language.

16. The system of claim 13, wherein the content is associated with a product and wherein the filtering step is further based on a set of product-specific exclusion conditions.

17. The method of claim 1, wherein the extracting includes extracting information on each candidate term, the information including a number of occurrences in the document and a location for each occurrence.

18. The method of claim 17, further comprising:

obtaining a set of common pre-modifiers;

modifying a candidate term by removing a pre-modifier in the set of common pre-modifiers; and merging information for the candidate term and a second candidate term based on the modifying.

* * * * *